(12) United States Patent
Pappas et al.

(10) Patent No.: US 11,207,823 B2
(45) Date of Patent: Dec. 28, 2021

(54) REMOVABLE EXTRUDER CAP

(71) Applicant: MakerBot Industries, LLC, Brooklyn, NY (US)

(72) Inventors: Michael C. Pappas, Houston, TX (US); Vishnu Anantha, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 88 days.

(21) Appl. No.: 16/570,435

(22) Filed: Sep. 13, 2019

(65) Prior Publication Data

US 2020/0086577 A1    Mar. 19, 2020

Related U.S. Application Data

(60) Provisional application No. 62/731,551, filed on Sep. 14, 2018, provisional application No. 62/777,587, filed on Dec. 10, 2018.

(51) Int. Cl.
*B29C 64/118*     (2017.01)
*B33Y 30/00*      (2015.01)
(Continued)

(52) U.S. Cl.
CPC .......... *B29C 64/118* (2017.08); *B29C 64/209* (2017.08); *B29C 64/232* (2017.08); *B29C 64/236* (2017.08); *B29C 64/245* (2017.08); *B29C 64/295* (2017.08); *B29C 64/321* (2017.08); *B29C 64/35* (2017.08); *B29C 64/379* (2017.08); *B29C 64/393* (2017.08); *B33Y 30/00* (2014.12); *B33Y 40/00* (2014.12);
(Continued)

(58) Field of Classification Search
CPC .............................. B29C 64/118; B29C 64/209
See application file for complete search history.

(56) References Cited

U.S. PATENT DOCUMENTS

| | | | |
|---|---|---|---|
| 4,500,895 A | 2/1985 | Buck et al. | |
| 4,931,812 A | 6/1990 | Dunn et al. | |

(Continued)

FOREIGN PATENT DOCUMENTS

| | | |
|---|---|---|
| CN | 301704558 S | 10/2011 |
| CN | 104589649 | 5/2015 |

(Continued)

OTHER PUBLICATIONS

Thermo Fisher Scientific, Material Safety Data Sheet Poly(tetrafluoroethylene), Revised Jan. 19, 2018 (Year: 2018).*

(Continued)

*Primary Examiner* — Joseph S Del Sole
*Assistant Examiner* — Ariella Machness
(74) *Attorney, Agent, or Firm* — Strategic Patents, P.C.

(57) ABSTRACT

A cap for an extruder of a three-dimensional printer is removeable and replaceable on the hot end of the extruder, e.g., for cleaning or other maintenance of the cap or extruder. The cap may be formed of a polymer having a lower thermal conductivity than the hot end of the extruder such that the cap forms a thermal barrier between the hot end of the extruder and an external environment. Further, the cap may protect the hot end of the extruder from damaging contact with deposited build material (e.g., spatters) as well as other undesirable contact during a three-dimensional printing process.

20 Claims, 6 Drawing Sheets

(51) Int. Cl.

| | | |
|---|---|---|
| *B33Y 40/00* | (2020.01) | |
| *B29C 64/379* | (2017.01) | |
| *B29C 64/209* | (2017.01) | |
| *B29C 64/321* | (2017.01) | |
| *B29C 64/295* | (2017.01) | |
| *B29C 64/393* | (2017.01) | |
| *B33Y 50/02* | (2015.01) | |
| *B29C 64/245* | (2017.01) | |
| *B29C 64/232* | (2017.01) | |
| *B29C 64/236* | (2017.01) | |
| *B29C 64/35* | (2017.01) | |
| *B33Y 10/00* | (2015.01) | |
| *B29C 64/182* | (2017.01) | |

(52) U.S. Cl.
CPC ............ *B33Y 50/02* (2014.12); *B29C 64/182* (2017.08); *B33Y 10/00* (2014.12)

(56) References Cited

U.S. PATENT DOCUMENTS

| | | | |
|---|---|---|---|
| 5,040,001 A | 8/1991 | Dunn et al. | |
| D368,275 S | 3/1996 | Sakurai et al. | |
| D392,671 S | 3/1998 | Sasaki | |
| 5,764,521 A | 6/1998 | Batchelder et al. | |
| D408,846 S | 4/1999 | Schwallie et al. | |
| 7,625,200 B2 | 12/2009 | Leavitt | |
| D634,362 S | 3/2011 | Inoue | |
| D637,227 S | 5/2011 | Deng et al. | |
| D696,721 S | 12/2013 | Kitagawa et al. | |
| 8,663,533 B2 | 3/2014 | Swanson et al. | |
| 9,233,506 B2 | 1/2016 | Leavitt | |
| 9,688,074 B1 | 6/2017 | Hall, Jr. et al. | |
| 9,744,730 B2 | 8/2017 | Comb | |
| 10,124,539 B2 | 11/2018 | Batchelder et al. | |
| D864,265 S | 10/2019 | Myers | |
| 2007/0228590 A1 | 10/2007 | LaBossiere et al. | |
| 2010/0166969 A1* | 7/2010 | Batchelder | B29C 64/106 427/402 |
| 2014/0159284 A1* | 6/2014 | Leavitt | H05B 3/42 264/401 |
| 2014/0362147 A1 | 12/2014 | Blowfield et al. | |
| 2014/0363532 A1 | 12/2014 | Wolfgram | |
| 2016/0236413 A1* | 8/2016 | Armani | B29C 48/92 |
| 2016/0263830 A1* | 9/2016 | Batchelder | B29C 64/118 |
| 2017/0361617 A1 | 12/2017 | Komplin et al. | |
| 2019/0322047 A1* | 10/2019 | Riha | B29C 64/118 |
| 2020/0079014 A1 | 3/2020 | Migliori et al. | |
| 2020/0086552 A1 | 3/2020 | Yarka | |
| 2020/0086566 A1 | 3/2020 | Goodman et al. | |
| 2020/0086569 A1 | 3/2020 | MacNeil et al. | |
| 2020/0130277 A1* | 4/2020 | Thorpe | B29C 64/106 |

FOREIGN PATENT DOCUMENTS

| | | |
|---|---|---|
| CN | 105291436 | 2/2016 |
| WO | WO-2020056300 | 3/2020 |

OTHER PUBLICATIONS

John E Wright Technical, Tip Shields—uPrint SE & uPrint SE Plus, Uploaded Apr. 9, 2014 https://www.youtube.com/watch?v=y4aXvAWDXkQ (Year: 2014).*

Engineering ToolBox,Thermal Conductivity of some selected Materials and Gases, [online] Available at: https://www.engineeringtoolbox.com/thermal-conductivity-d_429.html, Published 2003 (Year: 2003).*

Engineering ToolBox, Coefficients of Linear Thermal Expansion, [online] Available at: https://www.engineeringtoolbox.com/linear-expansion-coefficients-d_95.html, Published 2003 (Year: 2003).*

Parker Hannfin, Coefficient of Thermal Expansion, published Sep. 7, 2015, https://promo.parker.com/promotionsite/oring-ehandbook/us/en/ehome/Coefficient-of-Thermal-Expansion (Year: 2015).*

RGP Balls, Viton Rubber Balls, published Feb. 7, 2013, https://www.rgpballs.com/en/viton-rubber-balls/(Year: 2013).*

USPTO, "U.S. Appl. No. 29/684,141 Ex Parte Quayle Action mailed Mar. 9, 2020", 9 pages.

USPTO, "U.S. Appl. No. 29/684,141 Notice of Allowance dated Apr. 29, 2020", 5 pages.

ISA, "International Application Serial No. PCT/US19/51066, International Search Report and Written Opinion dated Feb. 3, 2020", 22 pages.

ISA, "International Application Serial No. PCT/US19/51066, Invitation to Pay Fees and Partial Search Report dated Dec. 12, 2019", 16 pages.

"MakerBot Smart Extruder+ for the Replicator, Replicator+, Mini and Mini+", 4 pages.

Stratasys, "Tip Shield", Stratasys Technical Disclosure 09-001 , 1 page.

WIPO, "Application No. PCT/US19/51066 International Preliminary Report on Patentability dated Mar. 26, 2021", 15 pages.

* cited by examiner

REMOVABLE EXTRUDER CAP

CROSS-REFERENCE TO RELATED APPLICATIONS

This application claims priority to U.S. Provisional Application No. 62/731,551 filed on Sep. 14, 2018 and U.S. Provisional Application No. 62/777,587 filed on Dec. 10, 2018, where the entire contents of each of the foregoing applications are hereby incorporated by reference.

FIELD

The present disclosure relates generally to three-dimensional printing, and more specifically to an extruder cap for a three-dimensional printer.

BACKGROUND

An extruder for a three-dimensional printer requires routine maintenance, as well as periodic resolution of technical issues, during which a user handles the extruder in situ or removes the extruder from the printer for service. In this context, the hot end of the extruder—the tip through which a heated build material is extruded—can present safety issues. The hot end is also susceptible to splatters, smearing, and other undesired accumulations of build material during use. There remains a need for an extruder cap addressing these issues.

SUMMARY

A cap for an extruder of a three-dimensional printer is removeable and replaceable on the hot end of the extruder, e.g., for cleaning or other maintenance of the cap or extruder. The cap may be formed of a polymer having a lower thermal conductivity than the hot end of the extruder such that the cap forms a thermal barrier between the hot end of the extruder and an external environment. Further, the cap may protect the hot end of the extruder from damaging contact with deposited build material (e.g., spatters) as well as other undesirable contact during a three-dimensional printing process.

In one aspect, an extruder disclosed herein for a three-dimensional printer includes a nozzle assembly defining a first orifice, a second orifice, and a chamber extending therebetween, where at least a portion of the nozzle assembly is formed of a first material along the chamber. The extruder also includes a cap having an inner surface and an outer surface opposite the inner surface, the cap defining an opening extending from the inner surface to the outer surface along a narrowest radial dimension of the cap, the chamber of the nozzle assembly extending through the opening such that the second orifice extends beyond the opening in an axial direction away from a perimeter of the nozzle assembly in contact with the inner surface of the cap, and the cap formed of a second material including a polymer having a second thermal conductivity less than a first thermal conductivity of the first material.

Implementations may include one or more of the following features. The first material of the nozzle assembly may have a first linear coefficient of thermal expansion, and the second material may have a second linear coefficient of thermal expansion greater than the first linear coefficient of thermal expansion. The inner surface of the cap may define a cavity in fluid communication with the opening, the cavity defining a first axis parallel to and axially offset from a second axis defined by the chamber of the nozzle assembly and extending through the second orifice. The extruder may further include an elongate heater supported on the nozzle assembly and in thermal communication with the chamber of the nozzle assembly, where the first axis defined by the cavity is between the second axis defined by the chamber and a third axis defined by the elongate heater. The contact between the inner surface and the perimeter of the nozzle assembly may circumscribe the perimeter of the nozzle assembly. The inner surface of the cap may include a tapered portion in contact with the perimeter of the nozzle assembly. The second orifice may be defined by a planar surface of the nozzle assembly, and at least a portion of the outer surface of the cap may define a plane oblique to the planar surface of the nozzle assembly. The contact between the inner surface of the cap and the perimeter of the nozzle assembly may be an interference fit. The cap may be removable from the perimeter of the nozzle assembly via deformation of at least a portion of the cap. The cap may include a flange, the nozzle assembly may define a ridge, and the flange may be releasably engageable with the ridge to restrict movement of the cap in at least the axial direction. The polymer may be an elastomer. The elastomer may be a fluoropolymer. The polymer may have a melting point of greater than about 200 degrees Celsius and less than about 350 degrees Celsius. The extruder may further include a feed system mechanically coupled to the nozzle assembly and spaced apart from the cap, the feed system including a gear train and a controller, the controller configured to actuate the gear train to move a build material into the chamber via the first orifice.

In one aspect, a three-dimensional printer disclosed herein includes a build plate, and an extruder including a nozzle assembly and a cap, the nozzle assembly defining a first orifice, a second orifice, and a chamber extending therebetween, at least a portion of the nozzle assembly formed of a first material along the chamber, the cap disposed between the nozzle assembly and the build plate in a direction extending from the nozzle assembly to the build plate, the cap defining an opening through which the chamber of the nozzle assembly extends and beyond which the second orifice of the nozzle assembly extends, the cap formed of a second material including an polymer. The three-dimensional printer also includes a build material in the chamber of the nozzle assembly and movable from the second orifice toward the build plate, the build material having a first melt temperature less than a second melt temperature of the second material of the cap.

Implementations may include one or more of the following features. The three-dimensional printer may further include a heater in thermal communication with the chamber, the heater controllable to a temperature between the first melt temperature of the build material and the second melt temperature of the second material of the cap. At least the first material of the nozzle assembly and a portion of the second material of the cap may be between the heater and an outer surface of the cap. The heater may be in thermal communication with the outer surface of the cap with a thermal resistance such that, with the heater at the temperature between the first melt temperature of the build material and the second melt temperature of the second material of the cap, the outer surface of the cap has a temperature of greater than about 35 degrees Celsius and less than about 70 degrees Celsius. The first material along the chamber of the nozzle assembly may have a first thermal conductivity and the second material of the cap has a second thermal conductivity less than the first thermal conductivity. The polymer may be structurally configured to resist adhesion to the build material moving from the second orifice toward the build plate during a three-dimensional printing process. The cap may be releasably secured to the nozzle assembly via a toolless fit between the cap and the nozzle assembly.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DESCRIPTION

Figure 1:
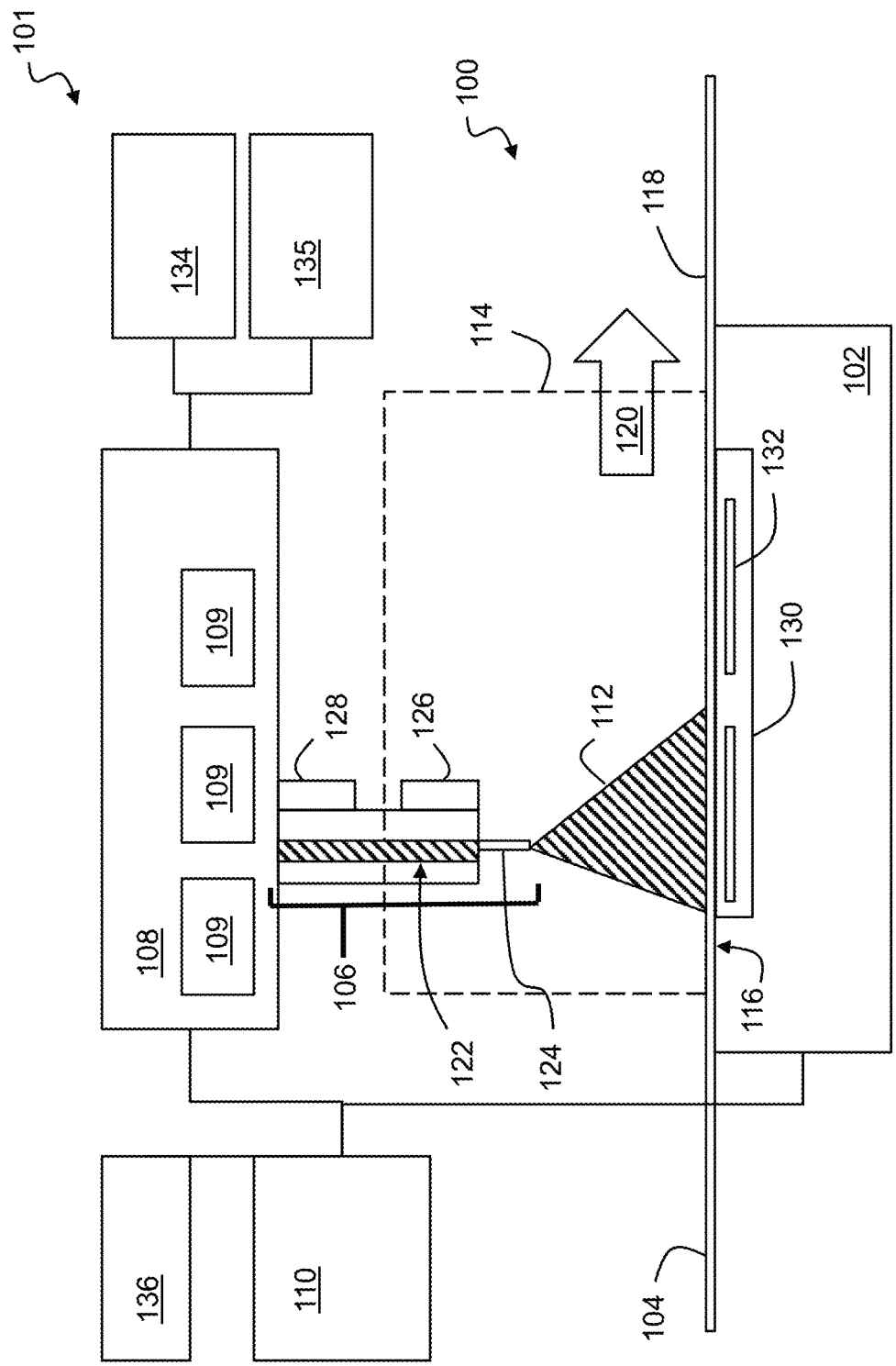
FIG. 1 is a block diagram of a three-dimensional printer.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for improvements in three-dimensional printing, such as improvements related to caps for extruders of three-dimensional printers.

The following description emphasizes three-dimensional printers using fused deposition modeling or similar techniques where a bead of material is extruded in a layered series of two dimensional patterns as "roads" or "paths" to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

FIG. 1 is a block diagram of a three-dimensional printer. In general, a printer 100 may include a build platform 102 (which may otherwise be referred to herein as a "build plate"), a conveyor 104, an extruder 106, an x-y-z positioning assembly 108, and a controller 110 that cooperate with one another to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that, while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor 104 may, additionally or alternatively, include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of build material to the surface 118 and/or to facilitate removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to facilitate build processes as described herein. For example, the chemical treatment may include deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 defining an exit port with a circular, oval, slotted or other cross-sectional profile that extrudes build material in a desired cross-sectional shape.

The extruder 106 may include a heater 126 to melt build materials (e.g., thermoplastic material) within the chamber 122 for extrusion through the extrusion tip 124 in melted form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also, or instead, include a motor 128 to push the build material into the chamber 122, through the extrusion tip 124, or a combination thereof.

In general operation (and by way of example rather than limitation), a build material, such as ABS plastic in filament form, may be fed into the chamber 122 from a spool by the motor 128, melted by the heater 126, and extruded from the extrusion tip 124. By controlling process parameters (e.g., one or more of a rate of the motor 128 and the temperature of the heater 126) the build material may be extruded at a controlled volumetric rate. It will be understood that a variety of techniques may be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be movable to three-dimensionally position the extruder 106 and the extrusion tip 124 within the working volume 114. Thus, for example, by controlling the volumetric rate of delivery for the build material and the x, y, z position of the extrusion tip 124, the object 112 may be fabricated in three dimensions by depositing successive layers of material in two-dimensional patterns derived (e.g., two-dimensional patterns derived from cross-sections of a computer model or other computerized representation of the object 112). The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. Additionally, or alternatively, the conveyor 104 may be x, y, and z positionable, and the extruder 106 may be, optionally, stationary. Further, or instead, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system may serve as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of material of the conveyer 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used, for example, to ensure that the object 112 is removed from the conveyer 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may include a sensor that detects a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (e.g., a radiant heater or forced hot air) to heat the working volume 114 to maintain the object 112 at a fixed, elevated temperature throughout a build. The sensor 134 may also, or instead, include a cooling element to maintain the object 112 at a predetermined sub-ambient temperature throughout a build. It should be appreciated that a heater included in the sensor 134 may be instead of, or in addition to, the thermal element 130.

The sensor 134 may also or instead include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also or instead include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long-range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Specific improvements to three-dimensional printing, e.g., using a three-dimensional printer as described above with reference to FIG. 1, will now be discussed. One such improvement may include a removable extruder cap. In general, as described herein, an extruder cap may include an end cap for an extruder of a three-dimensional printer. Stated otherwise, an extruder cap may at least partially cover the hot end of an extruder of a three-dimensional printer from which a heated build material is extruded or otherwise deposited. The extruder cap of the present teachings may include a snap-on cover made of a plastic material (e.g., a type of fluoropolymer such as perfluoroalkoxy alkanes (PFA) or polyfluoroethylenepropylene). The extruder cap of the present teachings may protect a portion of the extruder from spatters, and may cover a heated portion or component of the extruder for safety. The extruder cap of the present teachings may be permanently attached to an extruder, or it may be removable from the extruder.

Figure 3:
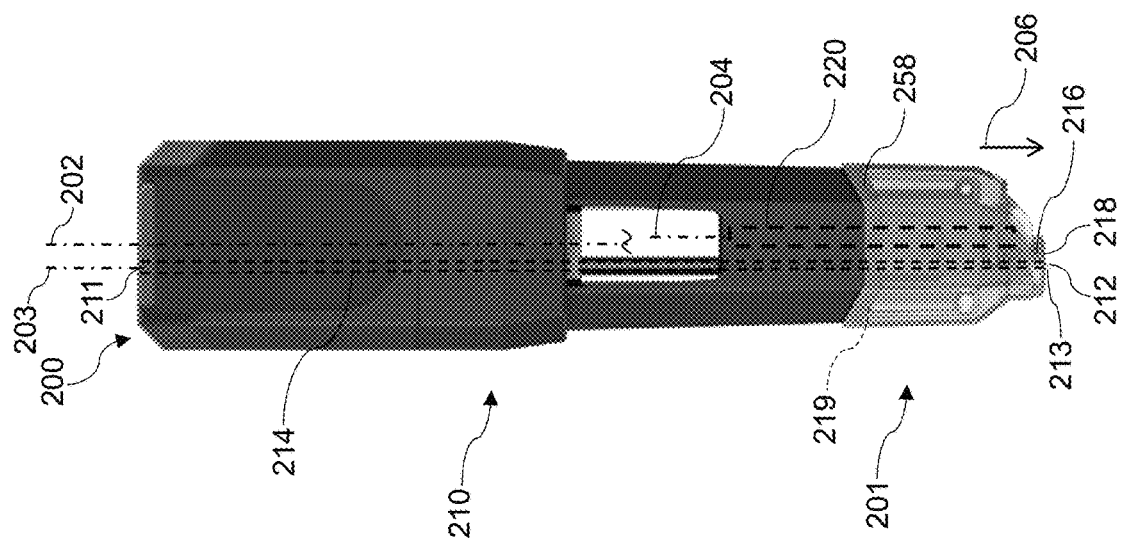
FIG. 3 shows a front view of an extruder with an extruder cap.
Figure 2:
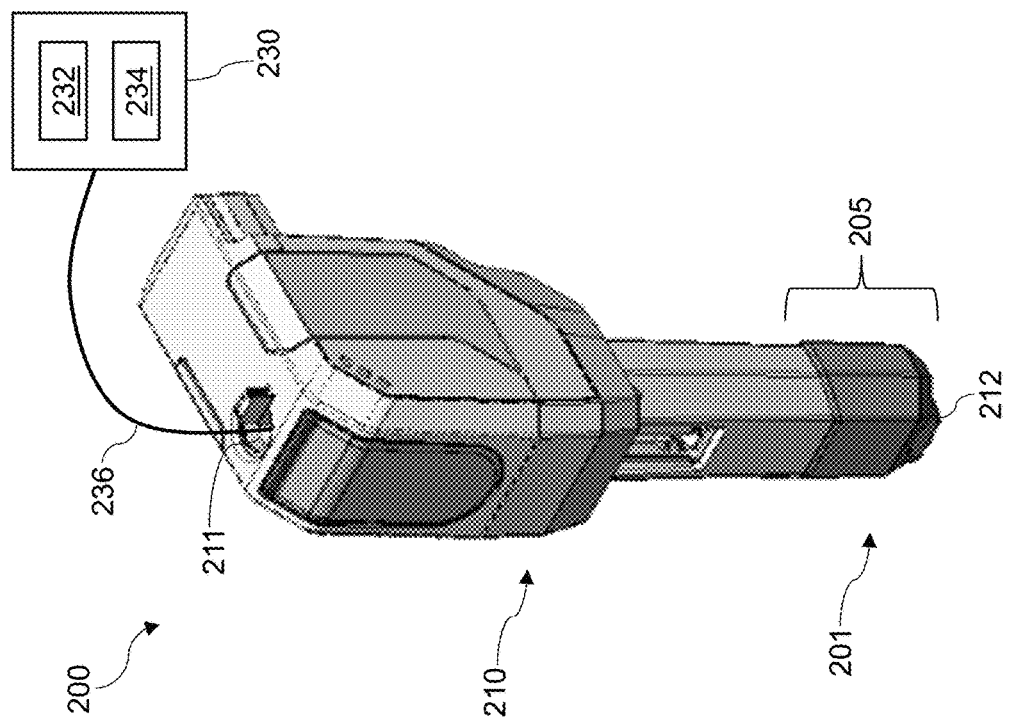
FIG. 2 shows a perspective view of an extruder with an extruder cap.

FIG. 2 shows a perspective view of an extruder with an extruder cap, and FIG. 3 shows a front view of an extruder with an extruder cap. Generally, the cap 201 may be disposed on the hot end 205 of the extruder 200, i.e., the end of the extruder 200 from which build material is extruded or otherwise deposited in a three-dimensional printing operation. The cap 201 may serve to thermally insulate the hot end 205 of the extruder 200 from an external environment, e.g., such that a user contacting the hot end 205 of the extruder 200 encounters the cap 201 in lieu of a portion of the extruder 200 that is heated and thereby at a significantly higher temperature than the cap 201. The cap 201 may also or instead protect a portion of the extruder 200 from contact with deposited build material during a three-dimensional printing operation. Thus, generally, the cap 201 may serve as a surface that is disposed between one or more portions of the extruder 200 and an external environment.

The extruder 200 may be included on a three-dimensional printer, such as the three-dimensional printer as described above with reference to FIG. 1. The extruder 200 may include a nozzle assembly 210 defining a first orifice 211, a second orifice 212, and a chamber 214 extending therebetween. The first orifice 211 may define an opening that receives a build material 236, e.g., a filament of build material 236 in a three-dimensional printer or printing system. Thus, the first orifice 211 may be an inlet for the extruder 200. The second orifice 212 may define an opening that releases build material 236, which may be heated build material, softened build material, melted build material and/or liquefied build material, for forming an object layer-by-layer in an additive manufacturing system. Thus, the second orifice 212 may be an outlet for the extruder 200, and may be included on or in a nozzle 213 or the like.

The chamber 214 may include a portion of the extruder 200 in which the build material 236 is heated for extrusion through the second orifice 212. Thus, the chamber 214 may include, or be disposed in thermal communication with, a heater 220. The chamber 214, a portion thereof, or a portion adjacent to the chamber 214 may be formed of a first material 216, or otherwise include a first material 216 along the chamber 214. This portion of the nozzle assembly 210 that is formed of the first material 216 may include a nozzle 213 defining the second orifice 212. The nozzle 213 may be part of the chamber 214 or the nozzle 213 may be otherwise coupled to the chamber 214. In general, the first material 216 may be selected for desirable nozzle-forming or extrusion properties such as strength, hardness, thermal conductivity, and so forth. For example, the first material 216 may include a metal alloy such as brass or the like.

As shown in these figures, and in particular FIG. 3, the chamber 214 (e.g., the portion of the chamber 214 defining the nozzle 213) may extend through the cap 201 such that the second orifice 212 extends beyond the cap 201 in an axial direction 206 away from a bottom surface 218 of the nozzle assembly 210, where the perimeter of this bottom surface 218 may be wholly encapsulated by, and in contact with, the cap 201 (i.e., an inner surface of the cap 201). That is, contact between the inner surface of the cap 201 and the perimeter of the nozzle assembly 210 may circumscribe the perimeter of the nozzle assembly 210.

The cap 201 may be removeable and replaceable on the extruder 200. In general, the cap 201 may be disposed on or around an exterior surface of the extruder 200, e.g., around or adjacent to the second orifice 212. Specifically, the cap 201 may be formed of an insulating polymer (e.g., an elastomer) that provides a thermal barrier between an exterior surface of the nozzle assembly 210 (at its hot end 205) and an ambient environment. That is, the cap 201 may be formed of a second material such as a polymer having a second thermal conductivity that is less than a first thermal conductivity of the first material 216 of the chamber 214, nozzle 213, or another portion of the nozzle assembly 210 that is encapsulated by the cap 201.

Similarly, the first material 216 of the nozzle assembly 210 may have a first linear coefficient of thermal expansion, where the second material of the cap 201 has a second linear coefficient of thermal expansion that is greater than the first linear coefficient of thermal expansion. This may represent the state of affairs because of the materials that can used for the nozzle assembly 210 and the cap 201. For example, the cap 201 may be made of a PFA material having a linear coefficient of thermal expansion of about $8 \times 10^{-5}$ (1/° C.) to about $12 \times 10^{-5}$ (1/° C.), or a polytetrafluoroethylene (PTFE) material having a linear coefficient of thermal expansion of about $7 \times 10^{-5}$ (1/° C.) to about $20 \times 10^{-5}$ (1/° C.); and the nozzle assembly 210 may be made of a cast steel material having a linear coefficient of thermal expansion of about $12 \times 10^{-6}$ (1/° C.), or a magnesium material having a linear coefficient of thermal expansion of about $26 \times 10^{-6}$ (1/° C.). However, the cap 201 may remain on the nozzle assembly 210 during use of the extruder 200 in a three-dimensional print because of thermal conductivity. That is, for a given temperature change of the nozzle assembly 210, the cap 201 may undergo a much smaller temperature change, and therefore, the cap 201 may expand less than the nozzle assembly 210 expands. Roughly speaking, the difference in the linear coefficient of thermal expansion may be one order of magnitude, but the difference in thermal conductivity may be about two to about three orders of magnitude. Further, there may exist a relatively large thermal resistance of air at the interface between the materials of the nozzle assembly 210 and the cap 201. This should be factored in, because heat may move through this gap to get to the cap 201. For example, the cap 201 may be made of a PFA having a thermal conductivity of about $2 \times 10^{-3}$ (W/cm-° C.), or a PTFE material having a thermal conductivity of about $2.5 \times 10^{-3}$ (W/cm-° C.); air at 20 degrees Celsius may have a thermal conductivity of about $2.5 \times 10^{-3}$ (W/cm-° C.), which may represent the interface between the materials of the nozzle assembly 210 and the cap 201; and the nozzle assembly 210 may be made of a case steel material having a thermal conductivity of about 0.36 (W/cm-° C.), or a magnesium material having a thermal conductivity of about 1 (W/cm-° C.). The combination of a relatively low thermal conductivity and relatively high coefficient of thermal expansion of the cap 201 may advantageously allow the cap 201 to expand enough to accommodate a change in size of the nozzle assembly 210 but not so much that the cap 201 will fall off, all while providing thermal insulation.

Thus, the cap 201 may be an insulating, protective component for the extruder 200, e.g., establishing a location on the hot end 205 of the extruder 200 that is substantially cool to the touch. For example, the cap 201 being "cool to the touch" in this manner may include the outer surface of the cap 201 having a temperature between about 35 degrees Celsius and about 70 degrees Celsius during operation of the extruder 200 (which has internal components that may be heated above 200 degrees Celsius), or shortly after operation of the extruder 200 (i.e., within about 1-10 minutes of use). In this manner, the cap 201 may enable the extruder 200 to be "office friendly," meaning that users are less susceptible to burns from touching the hot end 205 of the extruder 200 when the cap 201 is disposed thereon than they would otherwise be without such a cap 201.

In certain aspects, an outside surface of the cap 201 also or instead resists adhesion to build material extruded through the second orifice 212 during a three-dimensional printing operation. This characteristic can be achieved by constructing the cap 201 from, or coating the cap 201 with, suitable materials such as a non-stick material, an ablative material, a build-material-phobic material, or the like. Other techniques such as texturing may also or instead be employed. At the same time, the cap 201 may also usefully provide a removable and replaceable barrier to accumulations of material on the extruder 200 so that when material does accumulate on the cap 201, the cap 201 may be removed and replaced by an end user without a need for tools or time consuming or complex mechanical procedures that might otherwise be required to service a nozzle assembly 210 and related hardware.

The cap 201 may have an inner surface and an outer surface opposite the inner surface, where the cap 201 defines an opening extending from the inner surface to the outer surface along a narrowest radial dimension of the cap 201. That is, the opening of the cap 201 may be located at the portion of the cap 201 with the smallest radius (i.e., a portion of the cap 201 having the smallest cross-section relative to other portions of the cap 201). The chamber 214 of the nozzle assembly 210 may extend through the opening of the cap 201 such that the second orifice 212 extends beyond the opening in an axial direction 206 away from a perimeter of the nozzle assembly 210 in contact with the inner surface of the cap 201. In other words, the second orifice 212 may extend away from the bottom surface 218 of the nozzle assembly 210 and through an opening of the cap 201.

As best shown in FIG. 3, various components of the extruder 200 may be aligned or configured such that they are offset from a center axis 202 of the extruder 200. And, because the cap 201 may include a centrally-disposed first axis that is substantially aligned with the center axis 202 of the extruder 200, various components of the extruder 200 may be aligned or configured such that they are offset from the centrally-disposed first axis of the cap 201. For example, the chamber 214 of the nozzle assembly 210 may be offset from the center axis 202 of the extruder 200. Specifically, the chamber 214 of the nozzle assembly 210 may define a second axis 203 extending through the second orifice 212, where the centrally-disposed first axis of the cap 201 is parallel to, and axially offset from, this second axis 203 defined by the chamber 214 of the nozzle assembly 210. Also, or instead, an elongate heater 220 may be supported on the nozzle assembly 210 in thermal communication with the chamber 214 of the nozzle assembly 210, where the centrally-disposed first axis of the cap 201 (which, again, may be aligned with the center axis 202 of the extruder 200) is between the second axis 203 defined by the chamber 214 and a third axis 204 defined by the elongate heater 220.

In certain implementations, the cap 201 is secured (e.g., releasably secured) to the nozzle assembly 210 via a toolless fit between the cap 201 and the nozzle assembly 210. For example, the cap 201 may engage with the extruder 200 through an interference fit, e.g., using a flexible, elastomeric material that may form at least a portion of the cap 201. More specifically, contact between an inner surface of the cap 201 and a perimeter of the nozzle assembly 210 may be an interference fit, e.g., by sizing some or all of the regions of an interior of the cap 201 to be slightly smaller than corresponding exterior surfaces of the extruder 200 so that an elasticity of the polymer material of the cap 201 can apply tension around the nozzle assembly 210 and secure the cap 201 in place. In this manner, the cap 201 may be removable from the perimeter of the nozzle assembly 210, e.g., via deformation of at least a portion of the cap 201. The cap 201 may also or instead include structural features to more securely engage the cap 201 to the nozzle assembly 210, such as a flange 258 on an interior region of the cap 201 that is configured to mate to a ridge 219 on an exterior surface of the nozzle assembly 210, e.g., where the flange 258 is releasably engageable with the ridge 219 to restrict movement of the cap 201 (e.g., in at least the axial direction 206).

Turning back to FIG. 2, the extruder 200, or a system including the extruder 200, may further include a feed system 230 mechanically coupled to the nozzle assembly 210 and spaced apart from the cap 201. In certain implementations, the feed system 230 may include a gear train 232 and a controller 234, where the controller 234 is configured to actuate the gear train 232 to move a build material 236 into the chamber 214 via the first orifice 211. It will be understood that, although shown external to the extruder 200 in the figure, the feed system 230 may be wholly or partially disposed within a body or housing of the extruder 200. The controller 234 may also control the heater 220, another heating element, and other components of the system, and may receive feedback (e.g., from rotary encoders for filament position, thermocouples for temperature, and so forth) for use in controlling operation of the system or extruder 200.

Figure 4:
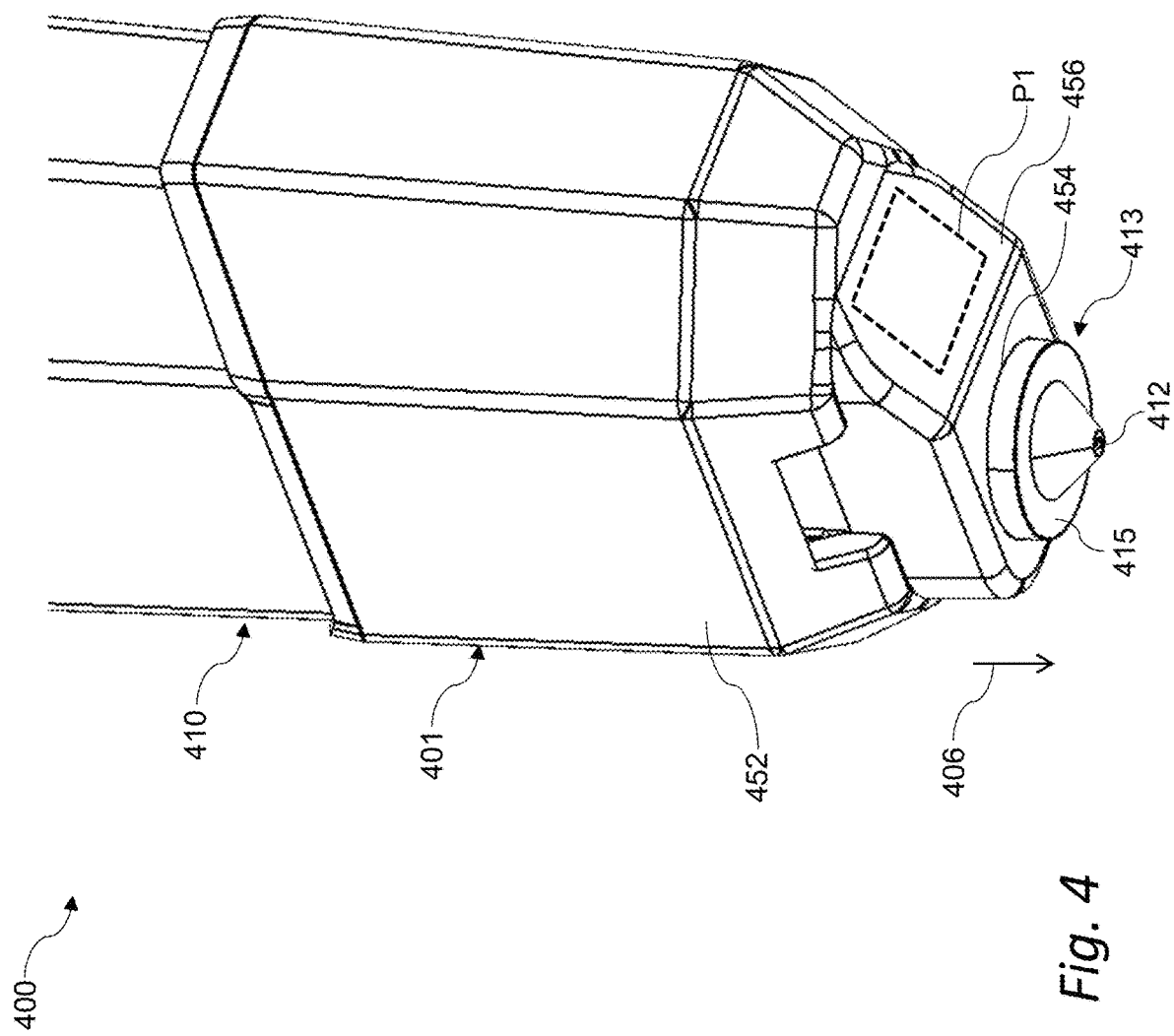
FIG. 4 shows a close-up view of the hot end of an extruder with an extruder cap.

FIG. 4 shows a close-up view of the hot end of an extruder with an extruder cap. The extruder 400 and the extruder cap 401 may be the same as or similar to those described above with reference to FIGS. 2 and 3. For example, the extruder may include a nozzle assembly 410 defining a first orifice, a second orifice 412, and a chamber extending therebetween, where at least a portion of the nozzle assembly 410 is formed of a first material along the chamber. The cap 401 may be disposed on the hot end of the extruder 400, where the cap 401 is structurally configured to establish a thermal barrier between the nozzle assembly 410 and an exterior environment. To this end, the cap 401 may be formed of a second material including an polymer having a second thermal conductivity that is less than a first thermal conductivity of the first material of the nozzle assembly 410. The polymer may be an elastomer; and, by way of example, the elastomer may be a fluoropolymer. In certain implementations, the polymer has a melting point of greater than about 200 degrees Celsius and less than about 350 degrees Celsius, although other melting points are also or instead possible for the material of the cap 401. For example, a high-temperature thermoplastic such as polyether ether ketone (PEEK) has a melting point well above 300 degrees Celsius, and a cap 401 for a PEEK-compatible extruder 400 might usefully be designed with a significantly higher melting point.

The cap 401 may also or instead be structurally configured to protect the nozzle assembly 410 (e.g., from build material or otherwise). For example, in certain implementations, the cap 401 is formed of an elastomer, where the elastomer is structurally configured to resist adhesion to build material being extruded from the second orifice 412 (e.g., build material moving from the second orifice 412 toward a build plate during a three-dimensional printing process).

Because the cap 401 may be formed by an elastomer, in certain implementations, the cap 401 is removable from the perimeter of the nozzle assembly 410 via deformation of at least a portion of the cap 401. For example, applying a force to opposing surfaces of the cap 401, e.g., to squeeze the sides of the cap 401 against the nozzle assembly 410, may deform the cap 401 from the shape shown in the figures, thereby promoting disengagement and removal of the cap 401 from corresponding surfaces of the nozzle assembly 410.

The cap 401 may have an inner surface (see, e.g., FIG. 5 below) and an outer surface 452 opposite the inner surface. The cap 401 may define an opening 454 extending from the inner surface to the outer surface 452 along a narrowest radial dimension of the cap 401. The chamber of the nozzle assembly 410 may extend through the opening 454 such that the second orifice 412 extends beyond the opening 454 in an axial direction 406 away from a perimeter of the nozzle assembly 410 in contact with the inner surface of the cap 401.

The cap 401 may include a tapered portion 456 shaped and sized to encapsulate at least a portion of the perimeter of the nozzle assembly 410. Further, and as discussed above, a nozzle 413 may define the second orifice 412, and at least a portion of the nozzle 413 may define a planar surface 415. In this manner, the tapered portion 456 may establish at least a portion of the outer surface 452 of the cap 401 that defines a plane P1 that is oblique to the planar surface 415 of the nozzle assembly 410. These angled surfaces may facilitate removal of the cap 401 by an application of force, e.g., by squeezing against the nozzle assembly 410, to opposing ones of the angled surfaces of the cap 401.

In general, it will be understood that the components described above with reference to FIGS. 2-4 may be part of a system, such as the three-dimensional printing system 101 including the three-dimensional printer 100 shown and described above with reference to FIG. 1 above. Specifically, in certain implementations, a three-dimensional printer using a cap as described herein further includes a build plate (see, e.g., the build platform 102 of FIG. 1), an extruder (such as any of those described herein), and a build material (such as any of those described herein, e.g., a filament of build material).

As part of this system, and as discussed herein, the extruder may include a nozzle assembly and a cap. The nozzle assembly may define a first orifice (e.g., an inlet), a second orifice (e.g., an outlet), and a chamber extending therebetween, where at least a portion of the nozzle assembly is formed of a first material along the chamber (e.g., a metal having a relatively high thermal conductivity). The cap may be disposed between the nozzle assembly and the build plate in a direction extending from the nozzle assembly to the build plate. The cap may define an opening through which the chamber of the nozzle assembly extends and beyond which the second orifice of the nozzle assembly extends. The cap may be formed of a second material including a polymer (e.g., an elastomer).

In general, the build material may be disposed in the chamber of the nozzle assembly, and the build material may be movable from the second orifice toward the build plate during a three-dimensional printing operation. The build material may have a first melt temperature that is less than a second melt temperature of the second material of the cap. As discussed here, the cap may be structurally configured to protect the extruder from damage or other issues (e.g., printing errors) that can be caused by extruded build material coming into contact with the extruder. For example, the polymer that is used to form the cap may be structurally configured to resist adhesion to the build material moving from the second orifice toward the build plate during a three-dimensional printing process.

Such a system may further include a heater, such as any of those described herein. The heater may be in thermal communication with the chamber, where the heater is controllable to a temperature between the first melt temperature of the build material and the second melt temperature of the second material of the cap. In certain implementations, at least the first material of the nozzle assembly and a portion of the second material of the cap is disposed between the heater and an outer surface of the cap. For example, the heater may be in thermal communication with the outer surface of the cap with a thermal resistance such that, with the heater at the temperature between the first melt temperature of the build material and the second melt temperature of the second material of the cap, the outer surface of the cap has a temperature of greater than about 35 degrees Celsius and less than about 70 degrees Celsius. As such, the first material along the chamber of the nozzle assembly may have a first thermal conductivity and the second material of the cap may have a second thermal conductivity that is substantially less than the first thermal conductivity.

FIGS. 5-9 show various views of a cap. The cap shown in FIGS. 5-9 may be the same or similar to any of the caps described above, e.g., with reference to FIGS. 2-4. Further, although different reference numbers are used for the cap (and its features) in FIGS. 5-9, it will be generally understood that the cap shown in FIGS. 5-9 may be the same embodiment of an extruder cap, although it is shown from different views in these figures for clarity and understanding.

Figure 5:
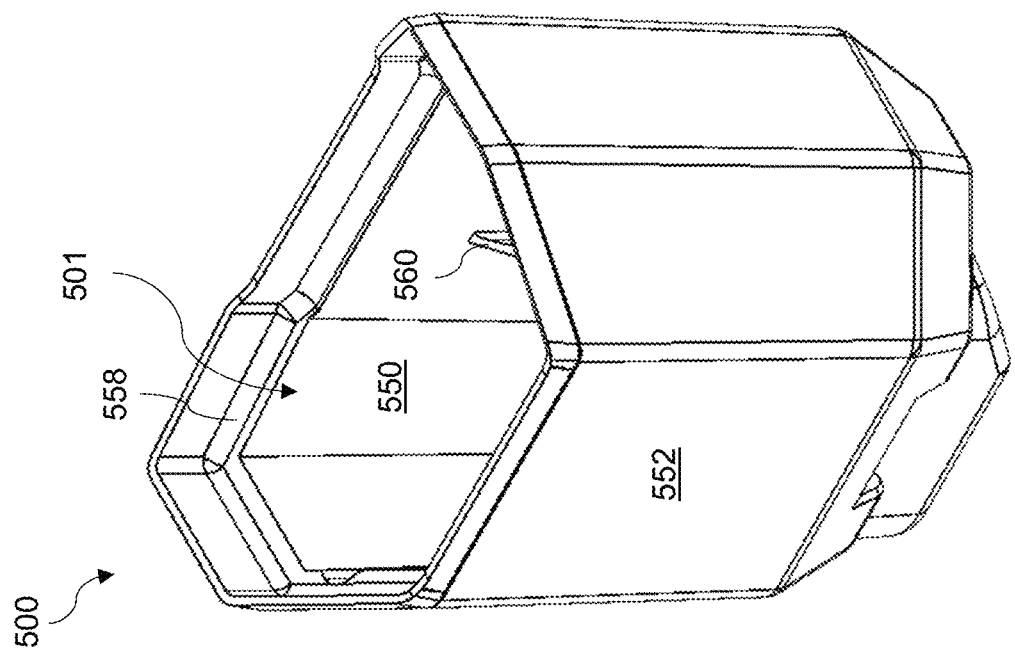
FIG. 5 is a perspective view of a cap for an extruder.

FIG. 5 is a perspective view of a cap for an extruder. As shown in FIG. 5, the cap 500 may include an inner surface 550 and an outer surface 552 opposite the inner surface 550. The cap 500 may define a cavity 501 for receiving the hot end of an extruder, such as any of the extruders described herein. In this manner, the inner surface 550 of the cap 500 may define a cavity 501 in fluid communication with the opening of the cap 500 (see FIG. 9 for a view of an opening 954). FIG. 5 also clearly shows a flange 558 that may be included on the cap 500. The flange 558 may be sized and shaped, or otherwise structurally configured, for engagement with a ridge included on an extruder. Also, or instead, the cap 500 may include one or more other engagement features 560 structurally configured for cooperation and engagement with corresponding engagement features included on an extruder. Such engagement features 560 may include one or more of an aperture, a protrusion, a ridge, a lip, a flange, a rib, and so on.

Figure 6:
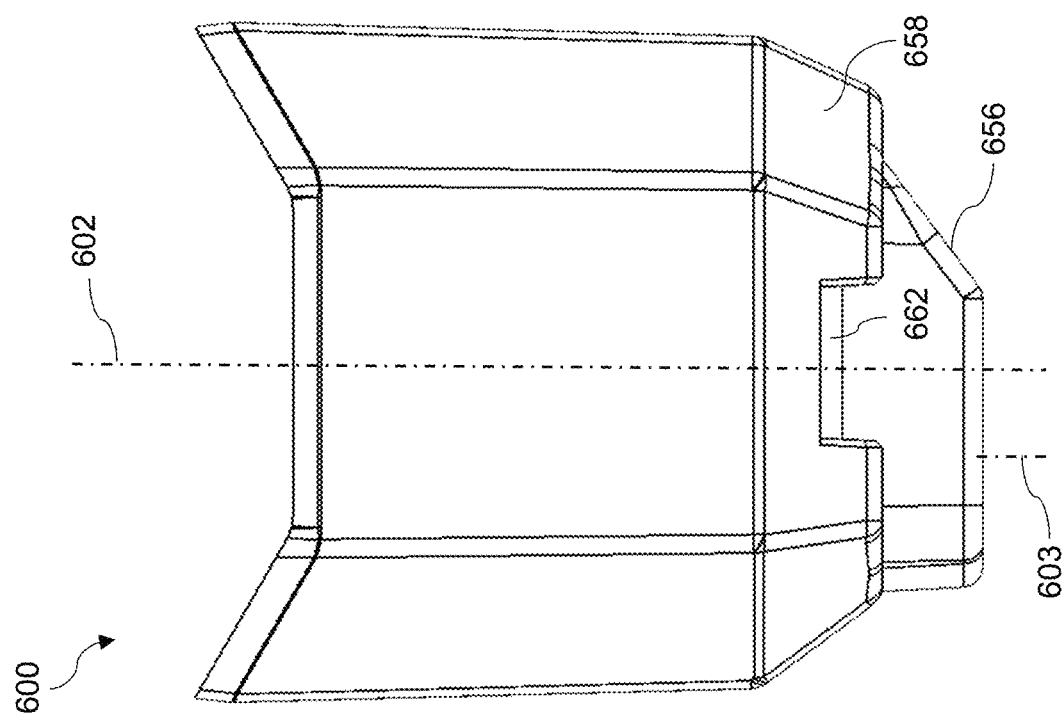
FIG. 6 is a front view of a cap for an extruder.

FIG. 6 is a front view of a cap for an extruder. FIG. 6 shows the cap 600 where several surfaces of interest are clearly depicted. For instance, as described herein, the cap may include one or more tapered portions. Specifically, in certain implementations, the cap 600 includes a first tapered portion 656 (generally defined by an inclined surface) that is sized and shaped to cooperate (on an inner surface thereof) with an end of a nozzle assembly of an extruder. Further, the cap 600 may include a second tapered portion 658 (generally defined by a plurality of tapered surfaces) that generally conforms to a tapered shape of an end of a nozzle assembly of an extruder.

As also shown in FIG. 6, the cap 600 may define one or more apertures 662. Such an aperture 662 may act as an engagement feature, i.e., to cooperate with a corresponding structure (e.g., a protrusion) on an extruder. Also, or instead, the aperture 662 may be structurally configured to vent a portion of the extruder—e.g., to allow heat transfer from the cavity of the cap 600 to an external environment. The aperture 662 may also or instead provide a gap or grasping area so that a user can squeeze the cap 600, thereby deforming the cap 600 for release of its engagement with an extruder.

FIG. 6 also shows how the cap 600 may include a first axis 602 through its center that is parallel to, and axially offset from, a second axis 603 that traverses through the center of the opening in the cap 600. As described above, the second axis 603 that traverses through the center of the opening in the cap 600 may be aligned with an axis defined by the cavity of an extruder, such that the first axis 602 of the cap 600 is also parallel to, and axially offset from, this axis defined by the cavity of the extruder.

Figure 7:
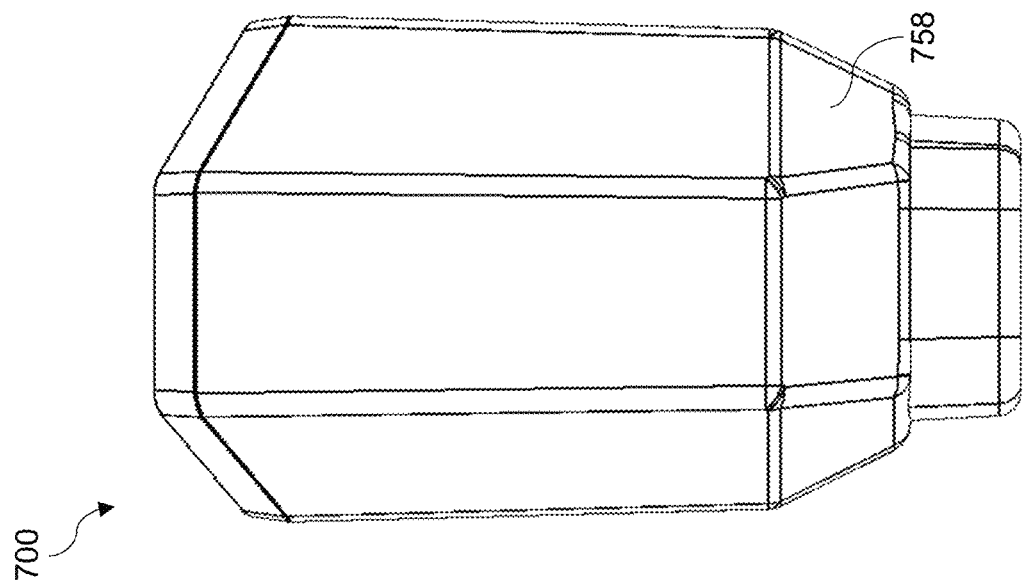
FIG. 7 is a left side view of a cap for an extruder.

FIG. 7 is a left side view of a cap for an extruder. FIG. 7 provides another view of the second tapered portion 758, which may be included on the cap 700 for cooperation and engagement with the hot end of an extruder. And again, this second tapered portion 758 may conform to the shape of a portion of the extruder.

Figure 8:
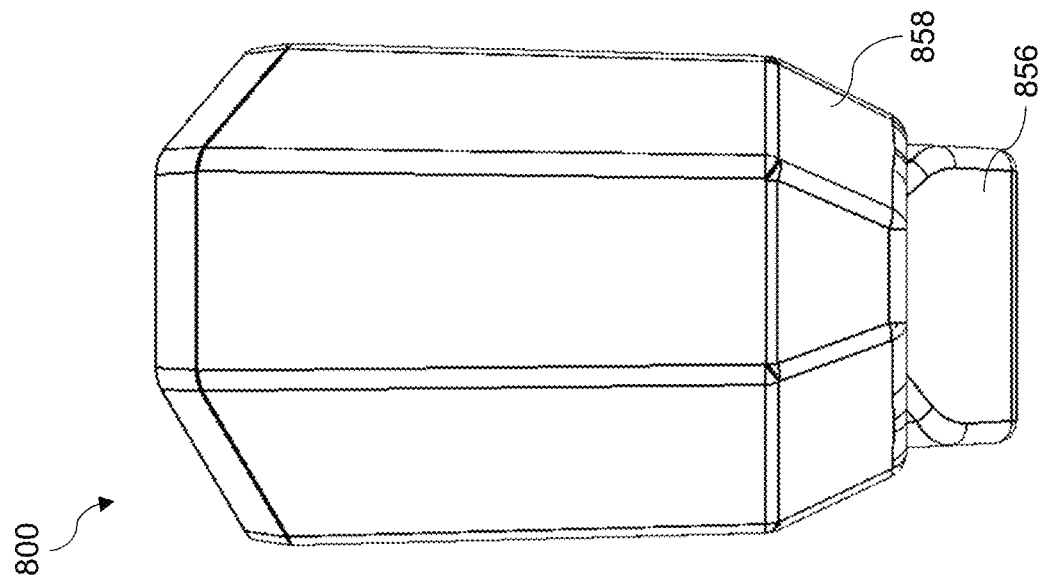
FIG. 8 is a right side view of a cap for an extruder.

FIG. 8 is a right side view of a cap for an extruder. FIG. 8 provides another view of the first tapered portion 856 and the second tapered portion 858, where each may be included on the cap 800 for cooperation and engagement with the hot end of an extruder.

Figure 9:
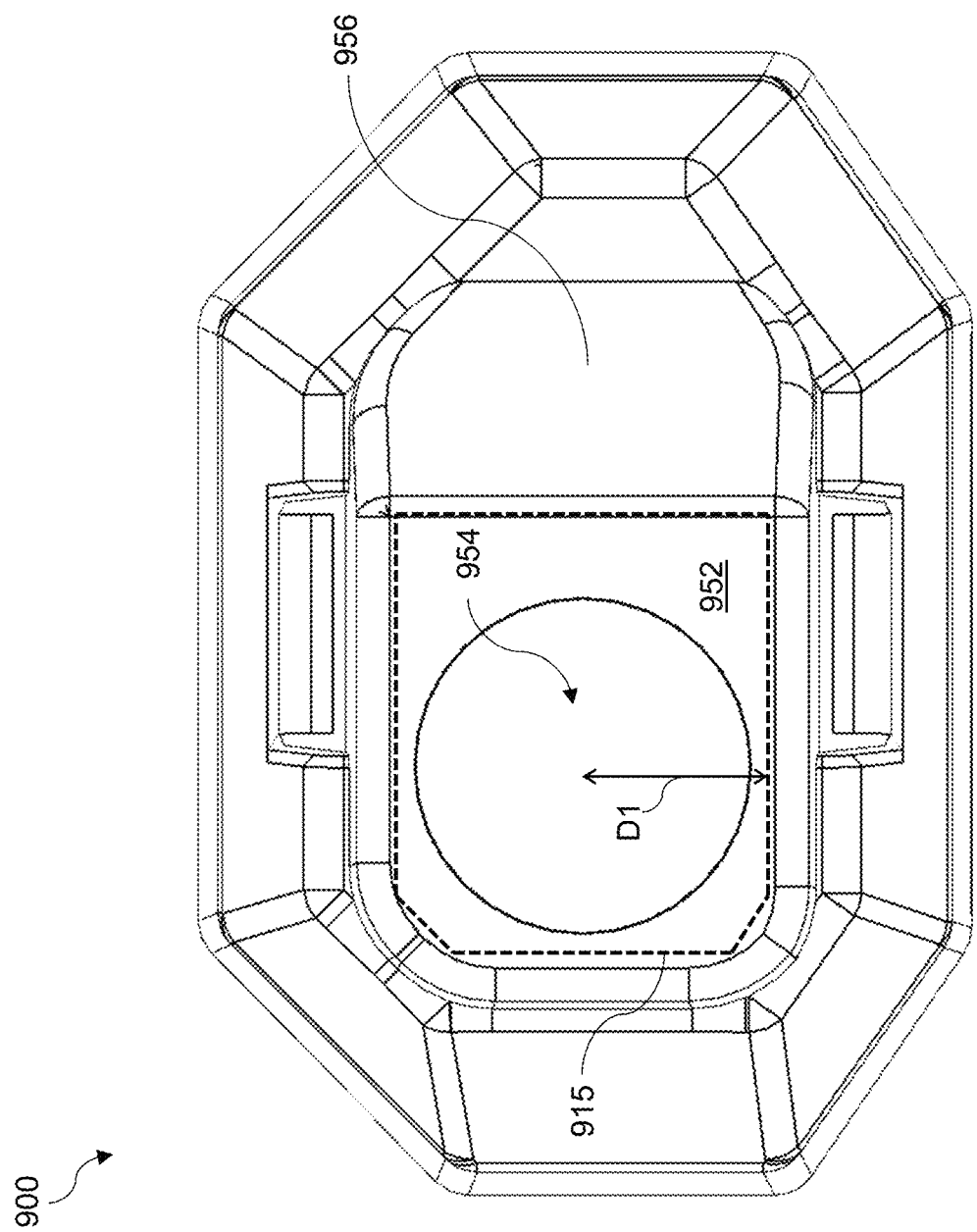
FIG. 9 is a bottom view of a cap for an extruder.

FIG. 9 is a bottom view of a cap for an extruder. The view of the cap 900 in FIG. 9 clearly shows the opening 954 of the cap 900. As discussed herein, the opening 954 may extend from the inner surface of the cap 900 to the outer surface 952 along a narrowest radial dimension D1 of the cap 900, where the narrowest radial dimension D1 of the cap 900 generally defines the portion of the cap 900 with the smallest radius or smallest cross-section. In general, the opening 954 may be sized and shaped such that a portion of a nozzle assembly (e.g., a nozzle) may extend through and beyond the opening 954 for extruding build material in a three-dimensional printing operation. More specifically, a portion of a nozzle assembly may extend through the opening away from a perimeter 915 of the nozzle assembly in contact with the inner surface of the cap 900, where a representation of the perimeter 915 of the nozzle assembly is shown in dashed lines for context.

As shown in the figure, the cap 900 may include surfaces that circumscribe the perimeter 915 of the nozzle assembly of an extruder. More particularly, contact between the inner surface of the cap 900 and the perimeter 915 of the nozzle assembly may circumscribe the perimeter 915 of the nozzle assembly. Further, and as described herein, the cap 900 may include one or more tapered portions (e.g., the first tapered portion 956) that engage and cooperate with corresponding surfaces included on an extruder. More particularly, the inner surface of the cap 900 may include one or more tapered portions (e.g., the first tapered portion 956) in contact with the perimeter 915 of the nozzle assembly of an extruder. These or other features of the cap 900 may facilitate an interference fit with the extruder. To this end, in certain implementations, contact between the inner surface of the cap 900 and the perimeter 915 of the nozzle assembly is an interference fit. The fit between the cap 900 and the extruder may also or instead include a snap-fit or the like. The cap 900 may also or instead include a retaining ring, clip, or other feature to mechanically retain the cap 900 in engagement with the nozzle assembly.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An extruder for a three-dimensional printer, the extruder comprising:
   a nozzle assembly defining a first orifice, a second orifice, and a chamber extending therebetween, at least a portion of the nozzle assembly formed of a first material along the chamber; and
   a cap having an inner surface and an outer surface opposite the inner surface, the cap defining an opening extending from the inner surface to the outer surface along a narrowest radial dimension of the cap, the chamber of the nozzle assembly extending through the opening such that the second orifice extends beyond the opening in an axial direction away from a perimeter of the nozzle assembly in contact with the inner surface of the cap, and the cap formed of a second material including a polymer having a second thermal conductivity less than a first thermal conductivity of the first material, the polymer including a flexible, elastomeric material that provides tension around a majority of a hot end of the nozzle assembly to secure the cap in place about the nozzle assembly.

2. The extruder of claim 1, wherein the first material of the nozzle assembly has a first linear coefficient of thermal expansion, and the second material has a second linear coefficient of thermal expansion greater than the first linear coefficient of thermal expansion.

3. The extruder of claim 1, wherein the inner surface of the cap defines a cavity in fluid communication with the opening, the cavity defining a first axis parallel to and axially offset from a second axis defined by the chamber of the nozzle assembly and extending through the second orifice.

4. The extruder of claim 3, further comprising an elongate heater supported on the nozzle assembly and in thermal communication with the chamber of the nozzle assembly, wherein the first axis defined by the cavity is between the second axis defined by the chamber and a third axis defined by the elongate heater.

5. The extruder of claim 1, wherein the contact between the inner surface and the perimeter of the nozzle assembly circumscribes the perimeter of the nozzle assembly.

6. The extruder of claim 1, wherein the inner surface of the cap includes a tapered portion in contact with the perimeter of the nozzle assembly.

7. The extruder of claim 1, wherein the second orifice is defined by a planar surface of the nozzle assembly, and at least a portion of the outer surface of the cap defines a plane oblique to the planar surface of the nozzle assembly.

8. The extruder of claim 1, wherein the contact between the inner surface of the cap and the perimeter of the nozzle assembly is an interference fit.

9. The extruder of claim 8, wherein the cap is removable from the perimeter of the nozzle assembly via deformation of at least a portion of the cap.

10. The extruder of claim 9, wherein the cap includes a flange, the nozzle assembly defines a ridge, and the flange is releasably engageable with the ridge to restrict movement of the cap in at least the axial direction.

11. The extruder of claim 1, wherein the elastomeric material is a fluoropolymer.

12. The extruder of claim 1, wherein the polymer has a melting point of greater than about 200 degrees Celsius and less than about 350 degrees Celsius.

13. The extruder of claim 1, further comprising a feed system mechanically coupled to the nozzle assembly and spaced apart from the cap, the feed system including a gear train and a controller, the controller configured to actuate the gear train to move a build material into the chamber via the first orifice.

14. A three-dimensional printer comprising:
a build plate;
an extruder including a nozzle assembly and a cap, the nozzle assembly defining a first orifice, a second orifice, and a chamber extending therebetween, at least a portion of the nozzle assembly formed of a first material along the chamber, the cap disposed between the nozzle assembly and the build plate in a direction extending from the nozzle assembly to the build plate, the cap defining an opening through which the chamber of the nozzle assembly extends and beyond which the second orifice of the nozzle assembly extends, the cap formed of a second material including a polymer, the polymer including a flexible, elastomeric material that provides tension around a majority of a hot end of the nozzle assembly to secure the cap in place about the nozzle assembly; and
a build material in the chamber of the nozzle assembly and movable from the second orifice toward the build plate, the build material having a first melt temperature less than a second melt temperature of the second material of the cap.

15. The three-dimensional printer of claim 14, further comprising a heater in thermal communication with the chamber, the heater controllable to a temperature between the first melt temperature of the build material and the second melt temperature of the second material of the cap.

16. The three-dimensional printer of claim 15, wherein at least the first material of the nozzle assembly and a portion of the second material of the cap is between the heater and an outer surface of the cap.

17. The three-dimensional printer of claim 16, wherein the heater is in thermal communication with the outer surface of the cap with a thermal resistance such that, with the heater at the temperature between the first melt temperature of the build material and the second melt temperature of the second material of the cap, the outer surface of the cap has a temperature of greater than about 35 degrees Celsius and less than about 70 degrees Celsius.

18. The three-dimensional printer of claim 14, wherein the first material along the chamber of the nozzle assembly has a first thermal conductivity and the second material of the cap has a second thermal conductivity less than the first thermal conductivity.

19. The three-dimensional printer of claim 14, wherein the polymer is structurally configured to resist adhesion to the build material moving from the second orifice toward the build plate during a three-dimensional printing process.

20. The three-dimensional printer of claim 14, wherein the cap is releasably secured to the nozzle assembly via a toolless fit between the cap and the nozzle assembly.

* * * * *